United States Patent [19]

Plaza et al.

[11] 4,034,935

[45] July 12, 1977

[54] DUAL LEVEL RIBBON CARTRIDGE

[75] Inventors: Mario G. Plaza, Fremont; Richard D. Trezise, Newark, both of Calif.

[73] Assignee: Xerox Corporation, Stamford, Conn.

[21] Appl. No.: 633,530

[22] Filed: Nov. 19, 1975

[51] Int. Cl.$^2$ .................... G03B 1/04; G11B 15/32; G11B 23/04

[52] U.S. Cl. ................................ 242/197; 352/72; 360/96

[58] Field of Search ................... 242/194, 197–200, 242/206; 352/72, 78 R, 156; 360/92–96, 73, 132

[56] References Cited

U.S. PATENT DOCUMENTS

| | | | |
|---|---|---|---|
| 3,140,832 | 7/1964 | Cech | 242/199 |
| 3,425,531 | 2/1969 | Fuld | 242/197 X |
| 3,510,605 | 5/1970 | Ottens | 242/194 X |
| 3,802,647 | 4/1974 | Esashi et al. | 242/199 |
| 3,862,729 | 1/1975 | Staar | 242/206 |

*Primary Examiner*—Leonard D. Christian
*Attorney, Agent, or Firm*—M. J. Colitz, Jr.; T. J. Anderson; Barry Paul Smith

[57] ABSTRACT

A ribbon cartridge comprising a housing, a supply reel containing a supply of ribbon wound thereon, a take-up reel, means for rotatably mounting the supply reel at a first location in the housing, means for rotatably mounting the take-up reel at a second location in the housing, the second location being spaced both vertically and horizontally from the first location, and means for transferring ribbon along a predetermined path from the supply reel onto the take-up reel.

8 Claims, 9 Drawing Figures

DUAL LEVEL RIBBON CARTRIDGE

BACKGROUND OF THE INVENTION

This invention relates to ribbon cartridges and, more particularly, to a ribbon cartridge of the type including a supply reel and a take-up reel both rotatably mounted in a common housing in spaced-apart relation.

Ribbon cartridges of the reel-to-reel type in general use today fall into one of two main categories: (1) those where the supply and take-up reels are mounted in the housing at the same vertical level, but are spaced apart horizontally a distance sufficient to enable the full winding of ribbon on the supply reel to be transferred onto the take-up reel; and (2) those where the supply and take-up reels are mounted in the housing at different vertical levels, but with aligned axes of rotation, i.e., they are spaced apart only vertically and not horizontally.

Ribbon cartridges falling into the first category have been most notably used in high speed serial impact printers, such as those employing rotatable print wheels and those of the dot matrix type. One particular high speed serial impact printer which has gained widespread recognition is the HyType I printer manufactured by Diablo Systems, Inc. of Hayward, Calif. The reel-to-reel ribbon cartridges used in that printer, falling into the first category, each have a supply reel and take-up reel which are mounted in the housing at the same vertical level, but in horizontally spaced-apart relation. This relationship has permitted the use of a mechanically simple and inexpensive slip drive mechanism for the take-up reel.

In accordance with such slip drive mechanism, ribbon is removed from the supply reel by a capstan-pinch roller arrangement which feeds the ribbon toward the take-up reel hub. The hub is rotatably mounted about a shaft and has a first pulley integrally formed therewith. The capstan is directly driven by an external drive and has a second pulley integrally formed therewith. A slip ring, such as an O-ring, is stretched about and coupled between the two pulleys. As the capstan is driven to feed ribbon toward the take-up hub, the hub is correspondingly rotated due to the O-ring coupling to take-up the slack and wind it on the hub. As the diameter of wound ribbon on the take-up reel increases, the O-ring is designed to start slipping about the take-up hub pulley, thereby permitting the hub to rotate at the necessary slower rate.

Although these ribbon cartridges have proven quite effective and desirable, particularly in view of the simplistic slip drive mechanism that may be used therewith, it would be desirable to increase the ribbon capacity thereof without substantially increasing the overall dimensions of the housing. At present, the maximum ribbon capacity is limited not only by the dimensions of the housing, but also by the horizontal spacing between the supply and take-up reels, since they are both at the same vertical level in the housing.

Ribbon cartridges falling into the second above-defined category have been most notably used in typewriters. These cartridges are characterized by a guide arm which extends outside of the cartridge housing and guides ribbon from the supply reel mounted at a first vertical level in the housing, over two cooperating 45° angle bends, and then back onto the take-up reel mounted at a second vertical level in the housing. Although the supply reel and the take-up reel are mounted at different levels thereby enabling the maximum wound diameter of each reel to be limited only by the dimensions of the housings, the reels are mounted with their axes of rotation of alignment thereby necessitating the use of a slip drive mechanism much more complicated and costly than the one described above. Further, if these cartridges were used with ribbon having a fast-release ink, there would be a tendency of ink to collect in the vicinity of the two 45° angle bends in the guide arm. An undue amount of collected ink might hamper efficient operation and cause smudging on the printed record medium.

It would be desirable, therefore, to provide a ribbon cartridge having an increased ribbon capacity than those of the first category above described, but which still is capable of using a simplistic slip drive mechanism of the type above described. It would further be desirable if such ribbon cartridge included a guide means for transferring ribbon between the two reels at different levels which did not have any pronounced ink collecting areas, such as the two 45° angle bends of the second category cartridges above described.

SUMMARY OF THE INVENTION

In accordance with the present invention, a ribbon cartridge is provided comprising a housing, a supply reel containing a supply of ribbon wound thereon, a take-up reel, means for rotatably mounting the supply reel at a first location in the housing, means for rotatably mounting the take-up reel at a second location in the housing, the second location being spaced both vertically and horizontally from the first location, and means for transferring ribbon along a predetermined path from the supply reel onto the take-up reel.

By having the supply and take-up reels spaced both vertically and horizontally, it is possible to maximize the wound diameter of each reel within the confines of the housing, while continuing to use a simple slip drive mechanism of the type above described.

In accordance with a further aspect of the present invention, the means for transferring includes guide means for guiding ribbon from the supply reel level to the take-up level, such guide means comprising a first roller mounted at the supply reel level for receiving ribbon from the supply reel, and a second roller mounted at the take-up reel level for receiving ribbon from the first roller. This arrangement avoids the ink collection problem alluded to above.

These and other aspects and advantages of the present invention will be more completely described below with reference to the accompanying drawings.

DESCRIPTION OF THE PREFERRED EMBODIMENT

Figure 1:
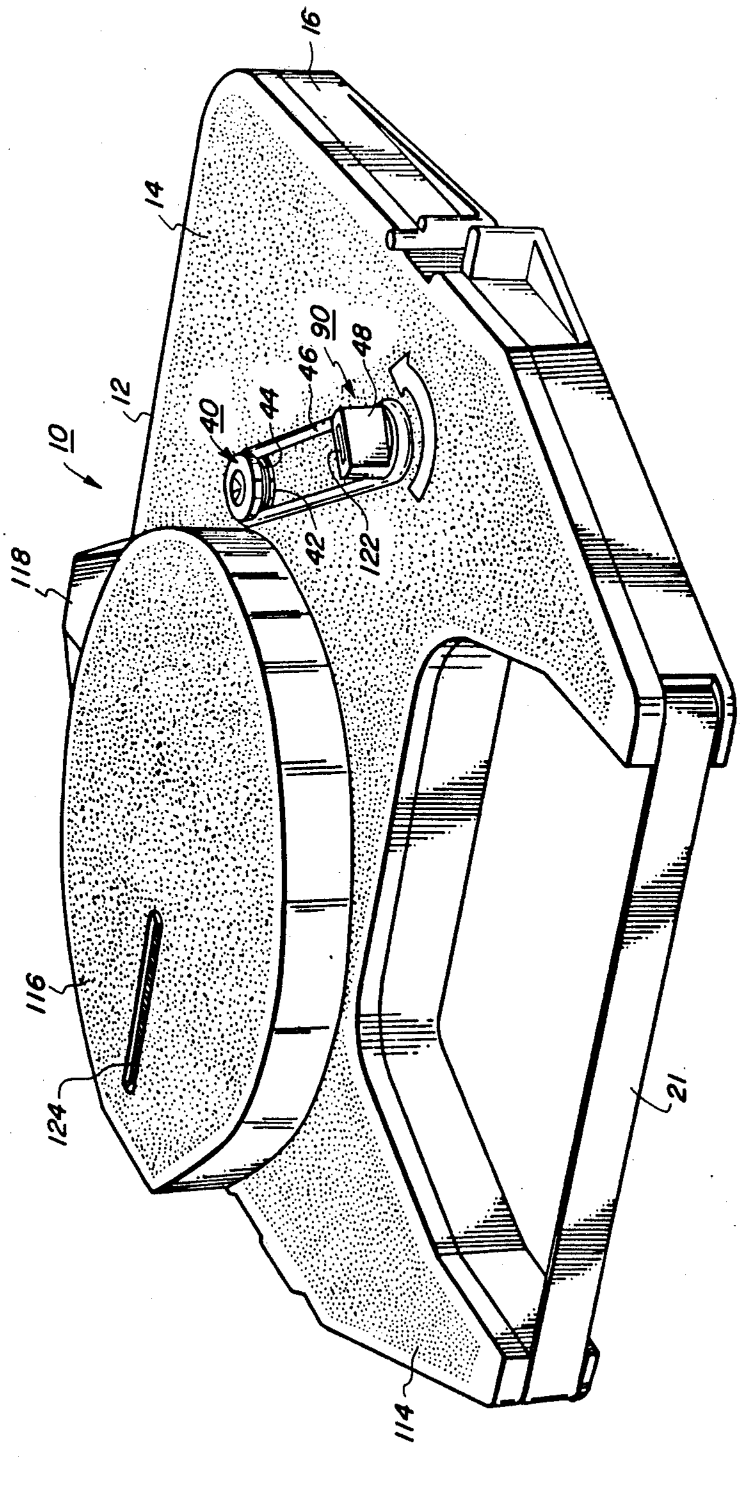
FIG. 1 is a perspective view of a ribbon cartridge according to the present invention.
Figure 2:
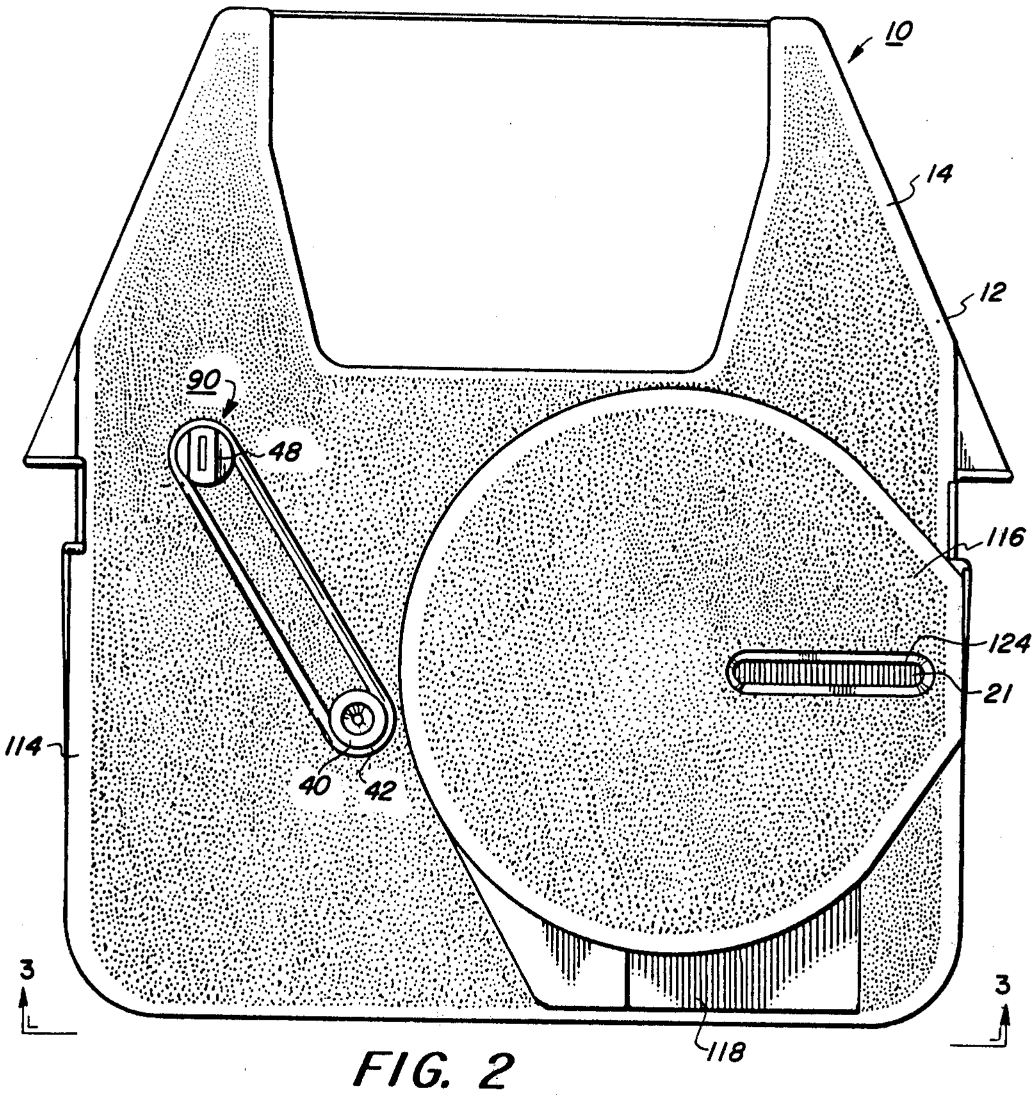
FIG. 2 is a top plan view of the ribbon cartridge of FIG. 1.
Figure 3:
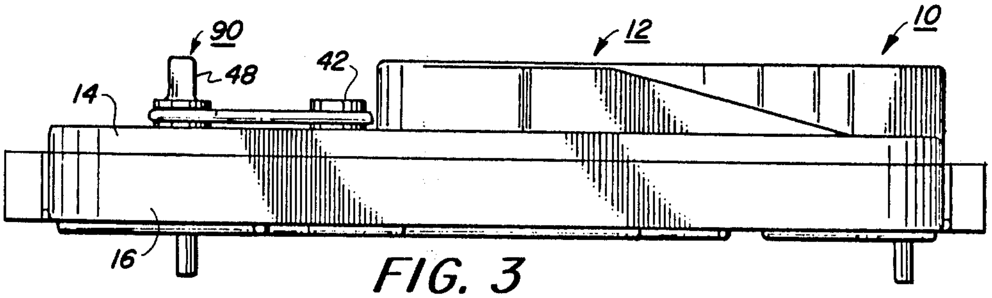
FIG. 3 is a rear elevation view of the ribbon cartridge of FIG. 1.

Referring to FIGS. 1–3, a ribbon cartridge 10 embodying the principles of the present invention is shown. Cartridge 10 includes a housing 12 which is preferably constituted by a top portion 14 and a bottom portion 16 which are snapped together in a manner to be described below. Each portion 14 and 16 is desirably manufactured of a light weight, durable material. Plastic is preferred since it is relatively inexpensive and can be easily molded.

Figure 4:
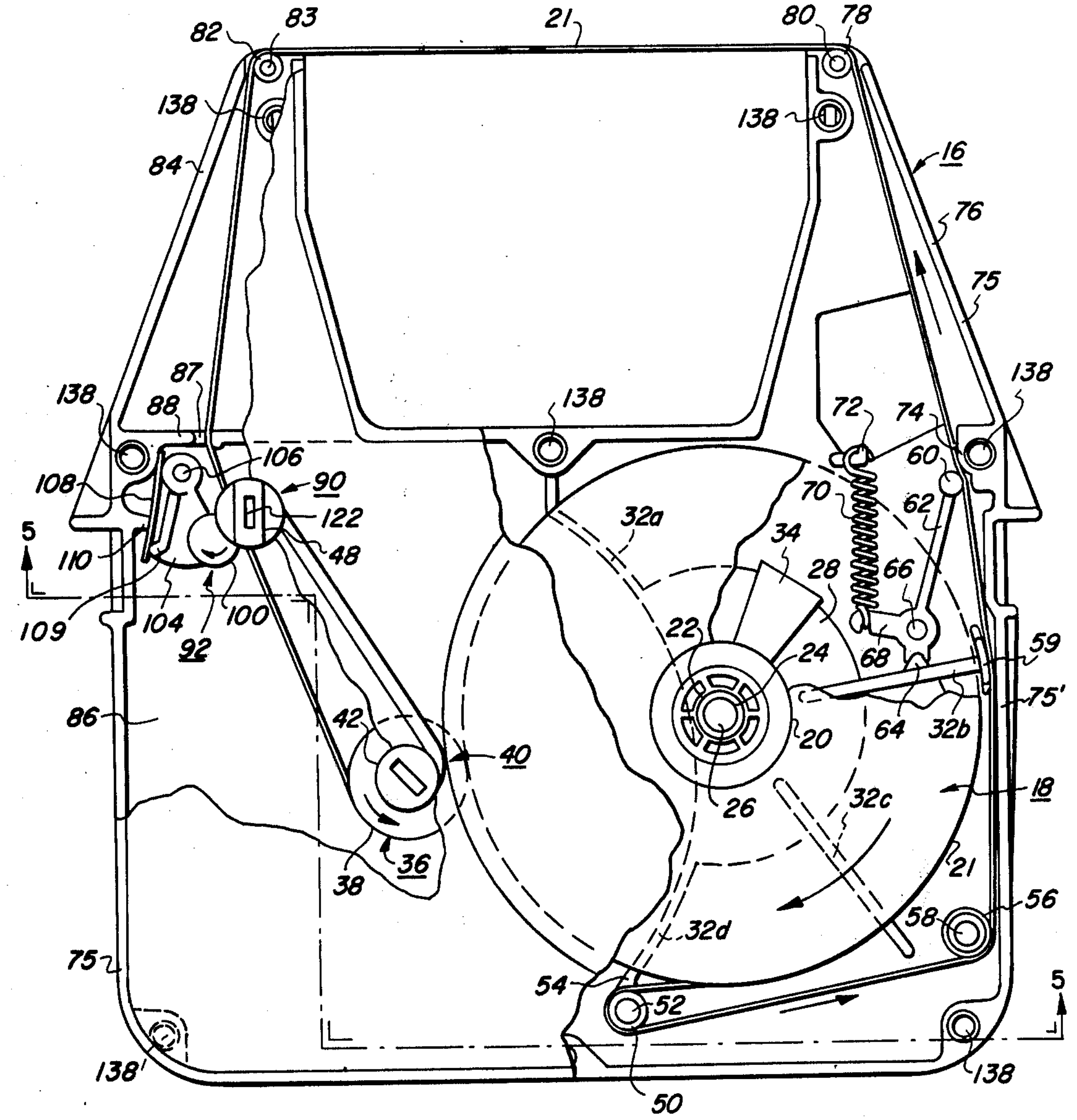
FIG. 4 is a top elevation view, partly broken away, of the ribbon cartridge of FIG. 1.
Figure 5:
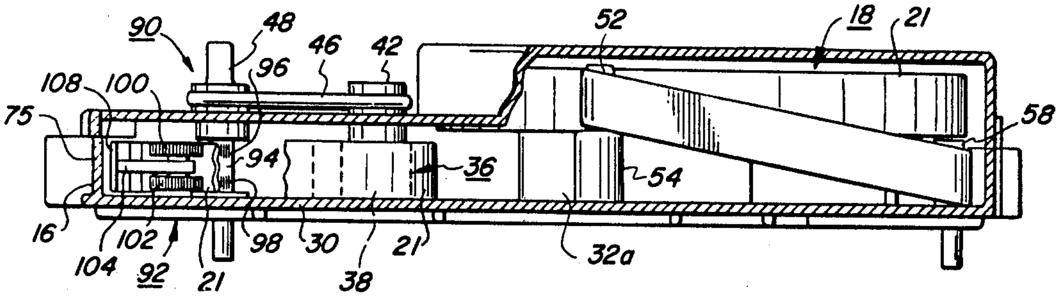
FIG. 5 is a cross-sectional view of the ribbon cartridge of FIG. 1 taken along lines 5—5 of FIG. 4.

Referring now to FIGS. 4 and 5 in conjunction with FIGS. 1–3, cartridge 10 further includes a supply reel 18 having a central hub 20 about which is wound a supply of ribbon 21 bearing a desired marking material, such as ink or the like. Hub 20 has a central tubular portion 22 including a cylindrical opening 24 therethrough for receiving a fixed shaft 26 in relatively movable relation so that hub 20 is freely rotatable about shaft 26. Shaft 26 extends upwardly from, and the lower end of tubular portion 22 is adapted to contact, a platform 28 which is desirably crescent-shaped for reasons to be discussed below. Platform 28 itself projects upwardly from the interior surface 30 of bottom portion 16 of cartridge housing 12.

A plurality of stiffening ribs 32*a–d* also project upwardly from surface 30 and extend radially outwardly from platform 28. A portion of each rib 32 overlies platform 28 for optimum stability and rigidity. In view of this relationship, tubular portion 22 of hub 20 is made sufficiently long in a downward direction so that, when positioned about shaft 26 in contact with platform 28, ribbon 21 wound about hub 20 will be spaced above platform 28 and ribs 32, but in contact with a drag element 34 mounted on platform 28. Drag element 34 is designed to provide a resistance to the removal of ribbon from the supply reel 18, as will be explained in more detail below.

Still referring to FIGS. 4 and 5, cartridge 10 further includes a take-up reel 36 which is mounted in housing 12 at a location spaced both vertically and horizontally from the location of the supply reel 18. Take-up reel 36 includes a hub 38 about which ribbon 21 removed from the supply reel is wound. The specific manner by which ribbon 21 is transferred from the supply reel and wound upon the take-up reel will be described in more detail below. At this point, however, it should be noted that hub 38 includes a cylindrical opening (not shown) for receiving in relatively rotatable relation a fixed shaft (also not shown) projecting upwardly from the interior surface 30 of the housing bottom portion.

Projecting upwardly from hub 38 and forming an integral part therewith is a follower pulley 40. The pulley 40 projects upwardly a distance sufficient to protrude through an opening 42 in the top portion 14 of housing 12. The pulley 40 has an annular groove 44 adapted to receive an endless flexible member, such as an O-ring 46, stretched between pulley 40 and a capstan pulley 48. As will be described in more detail below, capstan pulley 48 forms an integral part of a capstan assembly 90 and also has an annular groove (not shown) in which O-ring 46 is received.

As alluded to above, hub 38 is mounted to the bottom portion 16 of housing 12 at a different vertical level and in horizontal spaced relation relative to hub 20. The vertical spacing enables the maximum diameter of wound ribbon on the supply reel hub and take-up reel hub to be limited only by the size of the housing and not by the horizontal spacing between the hubs, as was the case with certain prior art ribbon cartridges. Accordingly, the capacity of ribbon employed may be significantly increased for any particular sized housing over the arrangement where the supply reel and take-up reel hubs are at the same vertical level.

Having the two hubs 20 and 38 spaced horizontally apart enables a very desirable slip drive mechanism to be employed which will now be described in conjunction with the overall description of the means employed for transferring ribbon 21 along a predetermined path from the supply reel 18 onto the take-up reel 36.

Figure 8:
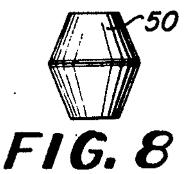
FIG. 8 is a side elevation view of a roller employed in the ribbon cartridge of FIG. 1.

Referring again to FIGS. 4 and 5, ribbon 21 is guided along a predetermined path between the supply reel 18 and the take-up reel 36. As shown in FIG. 4, ribbon 21 removed from the supply reel 18 is fed around a first roller 50 which is rotatably mounted about a pin 52 projecting upwardly from a base 54. Base 54 itself projects upwardly from the interior surface 30 and rib 32*d* extends outwardly therefrom. The height of base 54 and pin 52 is such that roller 50 is supported substantially at the same vertical level as the supply reel 18. Desirably, roller 50 is symmetrically crowned, as shown in FIG. 8.

Figure 9:
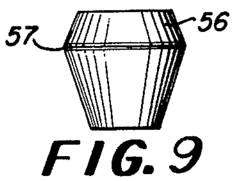
FIG. 9 is a side elevation view of another roller employed in the ribbon cartridge of FIG. 1.

From roller 50, ribbon 21 is fed around a second roller 56 which is fixedly mounted about a pin 58 projecting upwardly from interior surface 30. Roller 56 is supported substantially at the same vertical level as the take-up reel. Preferably, roller 56 is asymmetrically crowned, as shown in FIG. 9. More specifically, the apex 57 of the crown is preferably located closer to the upper end of the roller to insure that the ribbon does not "ride-up" the outer surface of the roller 56.

From roller 56, the ribbon 21 is advanced along a guide post 59 extending upwardly from surface 30 at the outer end of rib 32*b*. From the guide post 59, the ribbon is advanced past a bail bar 60 carried at the end of a lever arm 62 which extends from a base portion 64 pivoted about a pin 66. A dog 68 extends from base portion 64 and is coupled by a spring 70 to a support 72 mounted to the bottom portion 16 of housing 12. The spring is under tension thereby biasing the dog upwardly and the bail bar against the ribbon as shown in FIG. 4. With the bail bar 60 so positioned, ribbon will be guided in contact with the bail bar and a shoulder 74 formed in the side wall 75 of the bottom portion 16 of housing 12.

From shoulder 74, the ribbon 21 is advanced through a first outwardly projecting section 76 of the housing bottom portion 16 to a third roller 78 rotatably mounted about a pin 80. Pin 80 itself extends upwardly from the interior surface 30 adjacent an outer open end of the section 76. Ribbon is guided along roller 78 and is fed outside of the housing. From roller 78, the ribbon is fed to a fourth roller 82 rotatably mounted about a pin 83 at the exposed outer end of a second outwardly projecting section 84. Rollers 78 and 82 are both preferably right circularly cylindrical in configuration.

From roller 82, ribbon 21 passes through the second section 84 into a main rectangular-shaped section 86 of the housing bottom portion 16. The ribbon actually passes through an opening 87 defined in a wall 88 separating the second projecting section 84 from the main section 86. The ribbon is biased against one edge of the wall 88 at opening 87 due to the location of a capstan assembly 90 and a pinch roller assembly 92 between which the ribbon is fed.

As best shown in FIG. 5, capstan assembly 90 comprises a main cylindrical portion 94 which is preferably serrated at two circumferential locations 96 and 98. These locations are aligned with a pair of serrated rollers 100 and 102 fixedly supported on opposite sides of a pivot plate 104 that is pivoted about a pin 106 upstanding from surface 30. Pivot plate 104 and rollers 100 and 102 constitute pinch roller assembly 92. Rollers 100 and 102 are biased against cylindrical portion 94 of capstan assembly 90 thereby defining a pair of nips through which ribbon 21 passes. Biasing is preferably accomplished by means of a leaf spring 108 positioned between assembly 92 and the side wall 75 of housing bottom portion 16. As best shown in FIG. 4, a lower end of spring 108 has an opening (not shown) in which a button 109 extending from plate 104 is disposed. In position, the spring is slightly bent due to contact with a projection 110 from the side wall 75. When so bent, the lower end of the spring is biased toward the capstan assembly 90 thereby biasing the plate 104 and thus rollers 100 and 102 in that direction.

It should be noted that the specific pinch roller assembly and biasing means thereof as described above are merely by way of example, as many other types and varieties could be employed. However, the use of a pinch roller assembly having a pair of spaced rollers with the biasing force being applied between the rollers, as is the case with assembly 92 and spring 108, is preferred since it insures positive contact of both rollers 100 and 102 with the capstan cylindrical portion 94, thereby avoiding misalignments and a resulting unevenly wound take-up reel.

Figure 6:
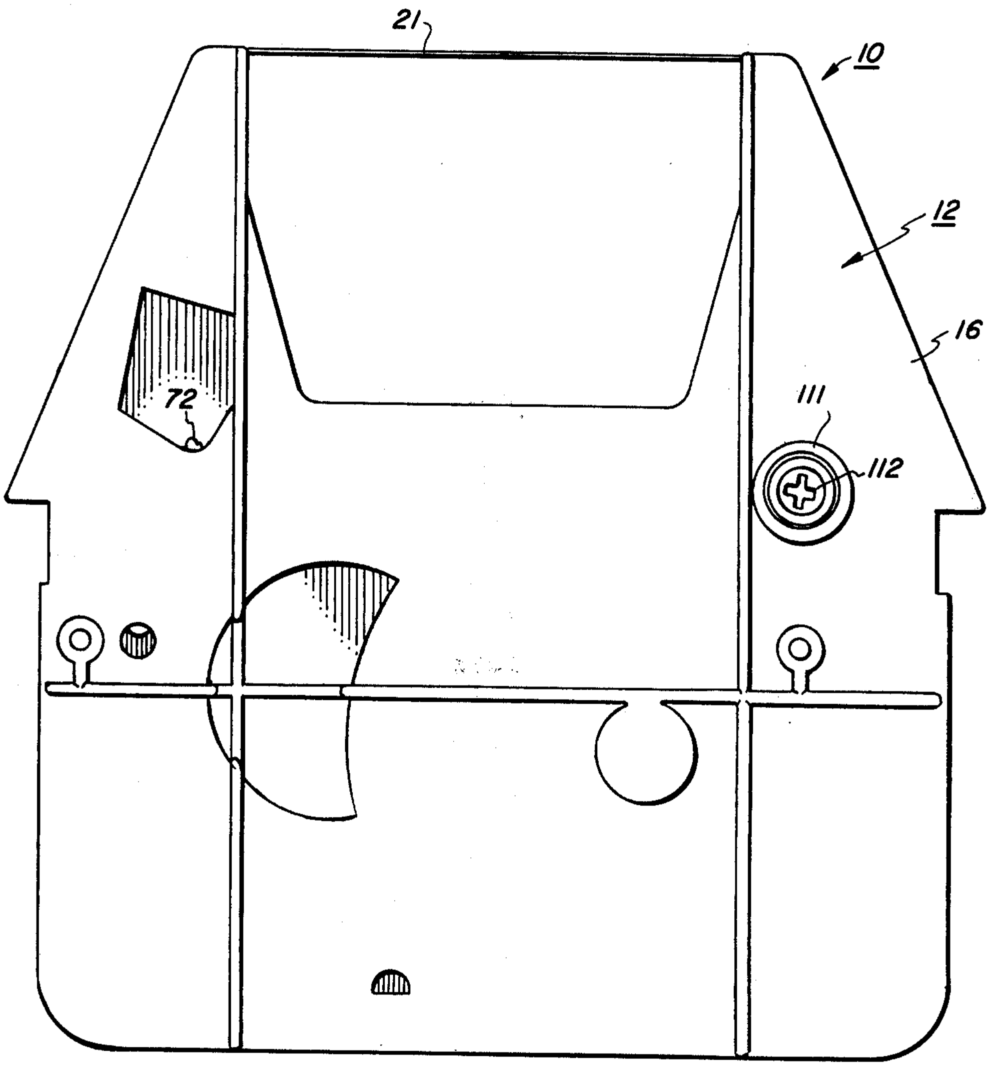
FIG. 6 is a bottom plan view of the ribbon cartridge of FIG. 1.

Referring to FIG. 6, the lower end of capstan assembly 90 is defined by a plate 111 having a cross-shaped opening 112 therein adapted to be engaged by an external drive (not shown). The capstan assembly is directly driven by such drive at a constant speed to advance ribbon through the nips toward the take-up reel hub 38. Obviously, the take-up reel must be driven in a desired direction, preferably counterclockwise as shown in FIG. 5, in order to take up the ribbon fed thereon through the nips. This is accomplished by the O-ring 46 which is stretched around the capstan pulley 48, forming the upper end of capstan assembly 90, and the follower pulley 40 extending from take-up reel hub 38. The O-ring is designed to start slipping relative to the groove 44 in pulley 40 as the diameter of wound ribbon on hub 38 increases in order to allow for a necessarily progressively slower rotation of the take-up reel relative to the capstan assembly 90.

The slip drive mechanism above described, as constituted by the external drive for the capstan, the pulleys 40 and 48 and the O-ring 46, is preferred due to its simplicity and low cost. In fact, it is a purpose of the invention to mount the supply and take-up reels spaced horizontally from one another in order to be able to use this mechanism. The reels are also spaced vertically in order to maximize the capacity of ribbon 21 included in the cartridge, as made clear above.

The top portion 14 of housing 12 will now be described with reference to FIGS. 1–3 and 7. Top portion 14 is formed of an outer surface 114 which is substantially flat over a majority of its surface area, but has a generally circular upwardly extending portion 116 which is of sufficient diameter and height to accommodate a fully wound supply reel therein when the top portion 14 is snapped together with bottom portion 16. In this regard, it will be recalled that the supply reel is mounted at a higher vertical level than the take-up reel which, as shown in FIG. 5, is contained wholly within the confines of the bottom portion 16. Outer surface 114 also preferably includes a sloping portion 118 adjacent portion 116 to follow the path of ribbon 21 from upper roller 52 to lower roller 58 (see FIG. 4).

In the flat part of surface 114 are formed openings 42 and 120 respectively having follower pulley 40 and capstan pulley 48 projecting therethrough. The upper end of capstan pulley 48 preferably extends sufficiently above surface 114 so that it may be manually rotated. Additionally, such upper end desirably includes a recess 122 therein so that the capstan may instead be rotated manually by a screwdriver or the like. Surface 116 desirably includes an elongated opening 124 therein disposed radially of the supply reel hub 20. The opening permits visual inspection of the quantity of ribbon 21 wound on hub 20.

Figure 7:
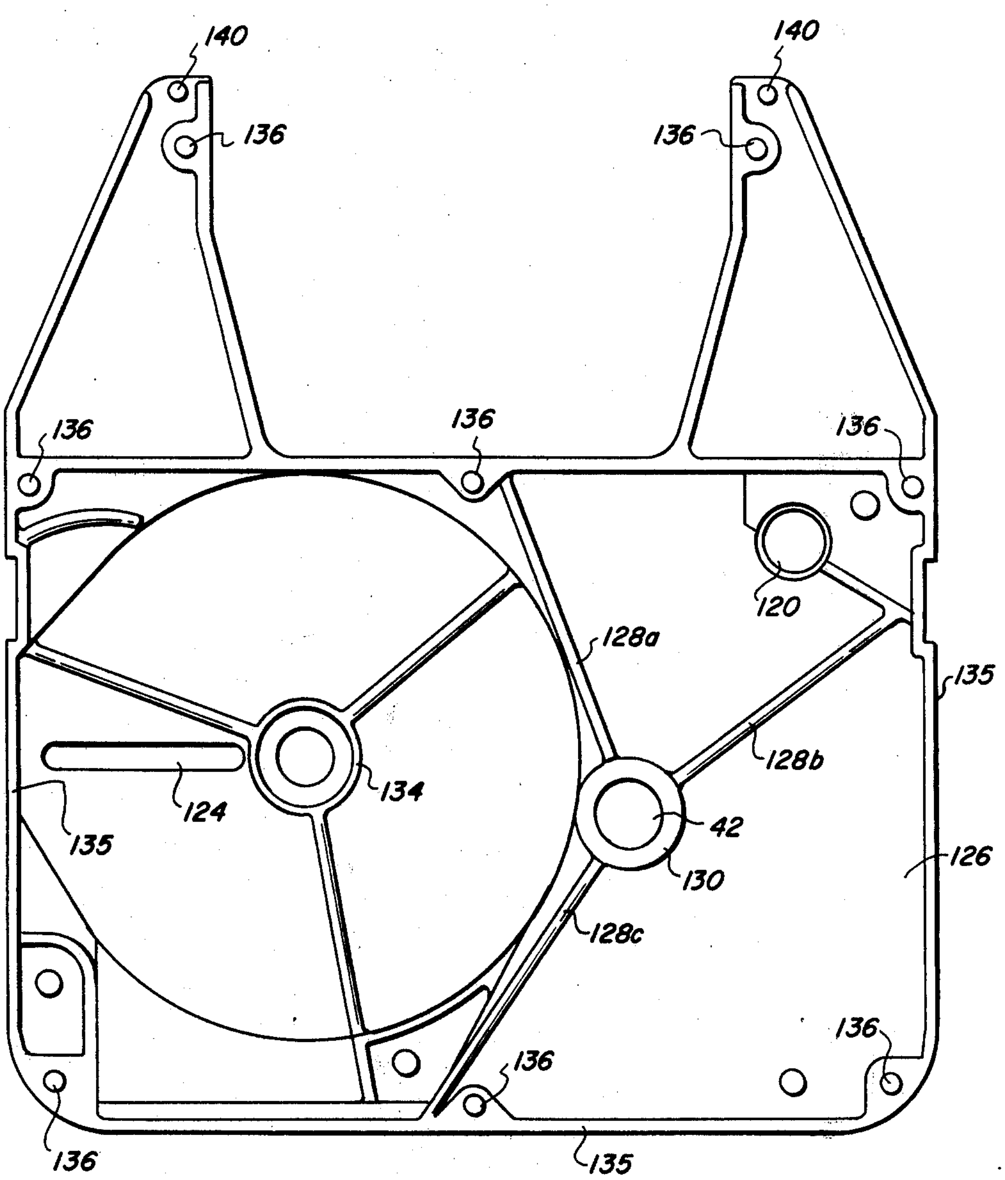
FIG. 7 is a elevation view of the underside of the top cover of the ribbon cartridge of FIG. 1.

Referring now more specifically to FIG. 7, it will be noted that the interior surface 126 of top portion 14 includes a plurality of ribs **121*a–c* extending radially from a central raised hub 130 formed about opening 42. In addition to such ribs providing the usual stiffening and strengthening function, rib 128*b* preferably is formed to extend a sufficient distance downwardly of surface 126 in order to contact ribbon 21 being fed onto the take-up reel hub 38 (FIG. 5**) and to guide such ribbon onto the take-up reel hub at the desired vertical level. In this manner, it is possible to obtain an extremely smooth and uniform edged winding on the take-up reel:

In the preferred embodiment, only rib **128*b* extends a distance sufficient to contact and guide the ribbon and not ribs 128*a* and 128*c*. Ribs 128*a* and 128*c* may, in fact, be deleted if the material of the housing top portion 14 is sufficiently stiff and strong without such ribs. Further, rib 128*b* need not extend radially from hub 130, but could rather be formed anywhere on surface 126**, so long as it is positioned to guide ribbon onto the take-up reel.

A plurality of ribs **132*a–c* are formed on the raised supply-reel portion of surface 126 about a hub 134. These ribs are preferred solely for stiffening and strengthening purposes and may be deleted if the material of the top portion 14 of housing 12** inherently provides the requisite degree of stiffness.

It will be noted that the side walls 135 of top portion 14 contain a number of downwardly extending pins 136 designed to be snapped into corresponding receptacles 138 formed in the side walls 75 of bottom portion 16 (FIG. 4). It will be further noted that a pair of pins 140 extend downwardly from the surface 126 at the front ends of each of the two sections of top portion 14 respectively conforming in shape to sections 76 and 84 of bottom portion 16. These pins are adapted to be received in the upper ends of rollers 78 and 82, it being noted that pins 80 and 83 do not extend upwardly as far as the vertical extent of the openings through rollers 78 and 82. Thus, with pins received in rollers 78 and 82, the chances of lateral or pivoted movement of such rollers is substantially reduced.

In operation, the capstan assembly 90 is driven to remove ribbon 21 from supply reel 18 and forward it along the path defined by rollers 50 and 56, post 59, bail bar 60, shoulder 74, rollers 78 and 82, and the nips between capstan assembly 90 and pinch roller assembly 92 and then onto the take-up reel 36. The take-up reel is rotated in the appropriate direction and speed by the slip drive mechanism discussed above.

The ribbon is maintained in tension, which is important for an efficient printing operation, by the frictional drag imposed upon the supply reel due to contact of the ribbon wound thereon by drag element 34. The drag element 34 may be formed of any suitable material, size and shape capable of establishing the requisite degree of frictional drag for the speed of movement of the ribbon. The use of a substantially trapezoidal shaped foam drag element positioned at the location shown in FIG. 4 has proven very effective.

Although the present invention has been described with reference to a presently preferred embodiment, it will be appreciated by those skilled in the art that various modifications, substitutions, etc., may be made without departing from the spirit and scope of the invention as defined by the appended claims.

What is claimed is:

1. A ribbon cartridge comprising:

a housing;

a supply reel containing a supply of ribbon wound thereon;

a take-up reel;

means for rotatably mounting the supply reel in said housing;

means for rotatably mounting the take-up reel in said housing at a location spaced sufficiently vertically from said supply reel such that the lower edge of ribbon wound on the higher of said reels is above the upper edge of ribbon wound on the lower of said reels, and also spaced horizontally from said supply reel a distance such that the distance between the axes of rotation of said reels is less than maximum combined radii of ribbon wound on said reels; and means for transferring ribbon along a predetermined path from said supply reel onto said take-up reel, said means for transferring comprising a capstan assembly, a pinch roller assembly, means for biasing said pinch roller assembly against said capstan assembly to form a nip through which said ribbon is fed, means for driving said capstan assembly to cause progression of ribbon through said nip and thus removal of ribbon from said supply reel, and means for kinematically coupling said capstan assembly to said take-up reel in order to rotate said take-up reel in the appropriate direction and speed to take up ribbon fed through said nip.

2. The ribbon cartridge of claim 1, wherein said means for transferring further includes guide means for guiding ribbon from the vertical level of said supply reel to the vertical level of said take-up reel, said guide means comprising:

a first roller mounted to said housing at the vertical level of said supply reel for receiving ribbon from said supply reel; and a second roller mounted to said housing at the vertical level of said take-up reel for receiving ribbon from said first roller.

3. The ribbon cartridge of claim 1, wherein said means for kinematically coupling comprises:

a first pulley forming part of said capstan assembly;

a second pulley forming part of said take-up reel; and a flexible ring coupled around and stretched between said pulleys, the ring being tensioned in an amount so as to allow for slippage of said ring relative to said second pulley to a degree which increases as the diameter of ribbon wound on said take-up reel increases.

4. The ribbon cartridge of claim 3, wherein said means for transferring further comprises:

a first roller mounted to said housing at the vertical level of said supply reel for receiving ribbon from said supply reel;

a second roller fixedly mounted to said housing at the vertical level of said take-up reel for receiving ribbon from said first roller, said second roller being asymmetrically crowned in a manner whereby its apex is located closer its upper end than its lower end; and means for guiding ribbon from said second roller to the nip between said capstan assembly and said pinch roller assembly.

5. The ribbon cartridge of claim 4, wherein said supply reel is at a higher vertical level in said housing than said take-up reel.

6. The ribbon cartridge of claim 1, wherein said supply reel is located above said take-up reel.

7. The ribbon cartridge of claim 2, wherein said second roller is asymmetrically crowned in a manner whereby its apex is located closer its upper end than its lower end.

8. A ribbon cartridge comprising:

a housing;

a supply reel containing a supply of ribbon wound thereon;

a take-up reel;

means for rotatably mounting the supply reel in said housing;

means for rotatably mounting the take-up reel in said housing at a location spaced sufficiently vertically from said supply reel such that the lower edge of ribbon wound on the higher of said reels is above the upper edge of ribbon wound on the lower of said reels, and also spaced horizontally from said supply reel a distance such that the distance between the axes or rotation of said reels is less than the maximum combined radii of ribbon wound on said reels; and means for transferring ribbon along a predetermined path from said supply reel onto said take-up reel, said means for transferring including guide means for guiding ribbon from the vertical level of said supply reel to the vertical level of said take-up reel, said guide means comprising a first roller mounted to said housing at the vertical level of said supply reel for receiving ribbon from said supply reel, and a second roller mounted to said housing at the vertical level of said take-up reel for receiving ribbon from said first roller, said second roller being asymmetrically crowned in a manner whereby its apex is located closer its upper end than its lower end.

* * * * *